Nov. 14, 1933.  S. O. WHITE  1,935,234

TRANSMISSION SYNCHRONIZER MECHANISM

Filed Dec. 18, 1931

INVENTOR.
Samuel O. White,
BY
Hood & Hahn.
ATTORNEYS

Patented Nov. 14, 1933

1,935,234

UNITED STATES PATENT OFFICE 1,935,234

TRANSMISSION SYNCHRONIZER MECHANISM

Samuel O. White, Muncie, Ind., assignor to Warner Gear Company, Muncie, Ind., a corporation of Indiana Application December 18, 1931
Serial No. 584,237

8 Claims. (Cl. 74—39)

My invention relates to improvements in synchronized transmission mechanism for automobiles and has particular reference to the connection between the synchronizer for the transmission gears and the operating member therefor.

In certain types of transmissions wherein certain of the gears are synchronized before being positively drivingly connected there is used an axially shiftable member, splined to the driven shaft and having friction clutch means adapted to cooperate with friction clutch faces connected to the driving members for the driven shaft. This friction clutch member is associated with a positive clutch member in such a manner that during the initial movement of the positive clutch member, the friction clutch member will move therewith and after the friction clutch member has been moved into operative engagement the connection between the friction and positive clutch members is broken to permit an independent movement of the positive clutch member.

In this type of transmission the connection means between the positive and friction clutch members preferably comprises a series of spring pressed ball poppets mounted in one of the members and adapted to engage in notches or recesses in the other member.

It is one of the primary objects of my invention to provide spring operated means for these ball poppets which will stand up for a long period without taking a set, which will deliver the same amount of pressure to the poppets during long continued operations and which may be satisfactorily installed in the limited space necessarily provided for the same.

For the purpose of disclosing my invention I have illustrated one embodiment thereof in the accompanying drawing, in which.

Figure 1:
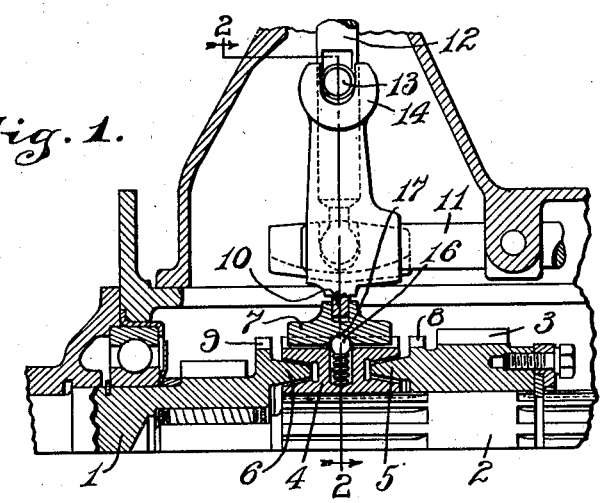
Fig. 1 is a longitudinal sectional view of so much of a transmission as is necessary to illustrate the invention.
Figure 2:
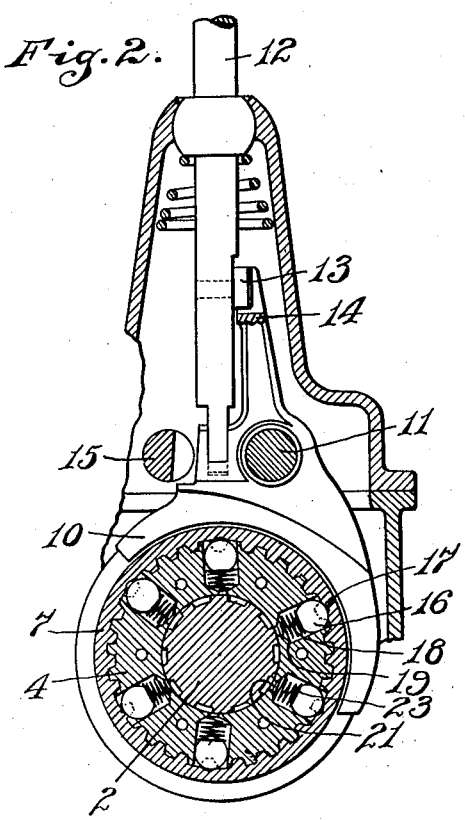
Fig. 2 is a sectional view on the line 2—2 of Fig. 1.
Figure 3:
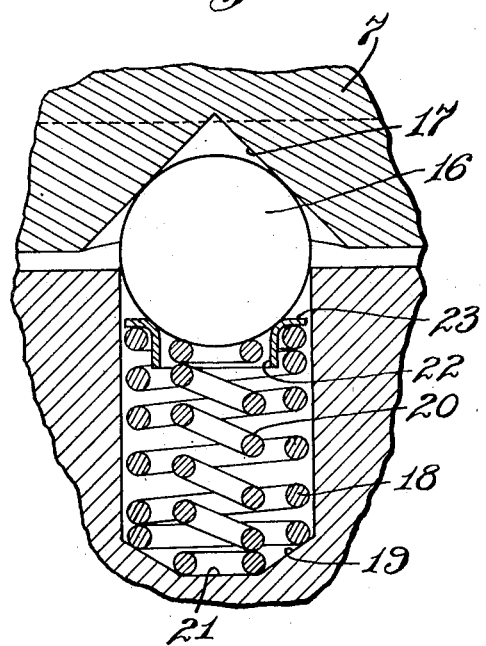
Fig. 3 is a detailed sectional view of one of the spring poppet portions.

In the structure illustrated the transmission shown is of the type wherein synchronization is effected between the driving shaft 1 and the driven shaft 2 or between the gear 3 rotatably mounted on the driven shaft 2 and the driven shaft. In this particular structure when connection is made directly between the driving shafts 1 and 2, high speed drive is effected. When the drive takes place through the medium of the gear 3, which gear is driven through a gear train from the driving shaft 1, second speed drive for the shaft 2 is effected.

In the structure illustrated for accomplishing the connection of the drive shaft 2 with either the drive shaft 1 or the drive shaft 3, I provide an axially slidable double faced cone clutch member 4 which is splined on the shaft 2. The opposite faces of this clutch member are adapted to respectively engage the friction faces 5 on the gear 3 and 6 on the shaft 1. An operating positive clutch member 7 is splined on the cone clutch member 4 and the splines thereof may engage either of the sets of teeth 8 on the gear 3 or 9 on the shaft 1 to positively connect either the gear or shaft 1 to the shaft 2. This positive clutch ring 7 is provided with an annular groove into which takes an operating fork 10 mounted on a shift rail 11 adapted to be operated by the shift rod 12 through the engagement of the connection 13 with a fork socket member 14 on an extension of the operating fork 10. By the specific construction above described, the engaging point of the shift rod with the fork 14 is nearer to the fulcrum point of the shift rod than the engaging point of the shift rod for a second shift rail 15 adapted to operate another portion (not shown) of the transmission.

In order that the cone clutch member 4 and the positive clutch member 7 may operate together during the initial movement of the shift rod 12, the two members are connected together by a releasable resilient connection comprising a series of poppet balls 16 annularly disposed about the cone clutch member 4 and adapted to seat in V shaped recesses 17, in the positive clutch member 7. Preferably, I provide a number, as many as six, of these poppet balls in order to give the correct degree of resilient connection. With this arrangement, when the positive clutch member 7 is initially shifted in either direction the friction clutch member will engage one of the friction clutch portions 5 or 6, dependent upon the direction of shift, and due to the resilient connection between the positive clutch member and the friction or cone clutch members 4, the friction clutch will be caused to engage to gradually synchronize the driving and driven members. By the time this synchronization has been effected a continued movement of the shift lever will disengage the positive clutch member 7 from the friction clutch member 4 and cause the positive clutch member to positively connect the driving member with the driven member. The poppets 16 are radially projected into the pockets or recesses 17 by the means of coiled springs deposited in radial bores in the friction clutch member 4. Due to the fact that there is quite a limited space in which to place these coiled springs and due to the fact that their compression and expansion occur at frequent intervals, it has been found difficult to cause these springs to operate at the proper pressure over long periods of time without taking a set and without losing their efficiency. In order to overcome this difficulty I provide an outer coiled spring 18, the bottom of which rests on a bottom portion 19 of the recess. The top of this spring is adapted to receive and support the poppets 16. Within this coiled spring is a separate small coiled spring 20 coiled in an opposite direction from that of the spring 19 and adapted to rest on a bottom portion 21 deeper than the portion 19 in the recess. This spring also receives and supports the ball 16.

It has been found that with the ball poppets 16 resting directly upon the coiled spring 19, the ball tends to expand the top or first coil of the spring causing the spring to lose a certain proportion of its weight and also expanding the spring until it frictionally contacts with the side walls of the recess thus destroying a certain amount of its responsiveness. Furthermore, it is desirable to maintain the inner and outer springs in proper spaced relation not only at their bottoms but at their tops. In order to accomplish the above results, I provide a thimble 22 which fits between the inner and outer coiled springs and is provided with an annular flange 23 adapted to overhang the top coil of the outer spring. Due to this annular thimble member the tendency of the poppet ball to spread the top coil of the outer spring is prevented. The tendency to spread the top coil of the inner spring is not so great as the smallness of the circle of the inner spring prevents any great wedging action on the part of the ball on this spring. It will be noted that the two springs are maintained in their relative position by the shape of the bottom of the recess in which the springs are located and by the thimble member, also due to the fact that the bottom portion 21 is lower than the bottom portion 19 compensation is made for the ball 16 so that, the proper engagement of both springs with the ball is effected. By the above construction danger of the springs taking a set under continued operation is prevented and the correct load imposed by the springs on the ball proper is maintained constant at all times.

I claim the following:

1. In combination, a pair of relatively movable members, one of said members having a poppet recess and the other a radial bore, a ball poppet operating in said bore and engaging said recess, a coiled spring arranged in said bore for projecting said poppet into said recess and an annular seating member interposed between said spring and said ball poppet and having a center opening therein to accommodate said poppet.

2. In combination, a pair of relatively movable members, one of said members having a poppet recess and the other a radial bore, a ball poppet operating in said bore for engagement in said recess and a pair of telescoping coiled springs arranged in said bore for projecting said ball into its recess and having their tops lying in different planes to accommodate the curvature of the ball.

3. In combination, a pair of relatively movable members, one of said members having a poppet recess and the other a radial bore, a poppet ball operating in said bore for engagement in said recess and a pair of telescoping springs coiled in opposite directions arranged in said bore for projecting said ball into its recess, the tops of said springs lying in different planes to accommodate the curvature of the ball.

4. In combination, a pair of relatively movable members, one of said members having a poppet recess and the other a radial bore having the bottom thereof in the form of a truncated cone, a poppet ball operating in said bore for engagement with said recess and a pair of telescoping coiled springs mounted in said bore for projecting the ball into its recess, one of said springs seating at the base of the cone and the other seating on the truncated portion of the cone.

5. In combination, a pair of relatively movable members, one of said members having a poppet recess and the other a radial bore, a ball poppet operating in said bore for engagement in said recess, said bore having its bottom in the form of a truncated cone, a pair of telescoping coiled springs mounted in said bore for projecting said poppet into its recess, the bottom of said bore being in the form of a truncated cone, one of said springs seating at the base of said cone and the other seated on the truncated portion thereof and a thimble interposed between the tops of said springs and having an annular flange overhanging the top of the outer spring to form a seating member for the ball.

6. In combination, a pair of relatively movable members, one of said members having a poppet recess and the other a radial bore, a poppet ball operating in said bore for engagement in said recess, a pair of telescoping coiled springs arranged in said bore for projecting said ball into its recess and means for maintaining said springs separated at their tops and bottoms.

7. In combination, a pair of relatively movable members, one of said members having a poppet recess and the other a radial bore, a poppet ball operating in said bore for engagement in said recess, a pair of oppositely coiled telescoping springs mounted in said bore for projecting said ball into its recess, the tops of said springs lying in different planes and a thimble separating the tops of said springs and having an annular flange extending over the top of the outer spring.

8. In combination, a pair of relatively movable members, one of said members having poppet recesses and the other a radial bore, a poppet ball operating in said bore for engagement in said recess, a pair of oppositely coiled telescoping springs mounted in said bore for projecting said ball into said recess and an annular seating member on the outer of said springs and having a center opening to accommodate said ball.

SAMUEL O. WHITE.